UNITED STATES PATENT OFFICE.

JOHN F. EDDLEMON AND WILSON L. WALKER, OF WITCHERVILLE, ARK.

SHOE AND LEATHER POLISH.

SPECIFICATION forming part of Letters Patent No. 265,041, dated September 26, 1882.

Application filed April 15, 1882. (No specimens.)

*To all whom it may concern:*

Be it known that we, JOHN F. EDDLEMON and WILSON L. WALKER, of Witcherville, in the county of Sebastian and State of Arkansas, have invented certain new and useful Improvements in Shoe and Leather Polish; and we do hereby declare that the following is a full, clear, and exact description of the invention, which will enable others skilled in the art to which it appertains to make and use the same.

To prepare this polish, which is in the nature of a blacking, we mix the following ingredients in the proportions stated, viz: one quart alcohol, four and one-half ounces gum-shellac, three ounces English rosin, one ounce oil of sassafras, one ounce castor-oil, one ounce lamp-black, and three-fourths of one ounce beeswax. These ingredients are placed in a tin vessel over a slow fire, stirring frequently until the shellac, rosin, and beeswax are dissolved, and the whole mixed thoroughly, which will require from twenty to thirty minutes. It is then removed from the fire, and, after cooling off, is ready for use.

This polish may be used for shoes and boots, harness, bags, or satchels, and all other leather goods, as it will not rub off, but gives it a fine and lasting gloss, besides softening it and rendering it water-proof by filling the pores. It should be applied with a brush or soft rag, (a piece of flannel is the best,) or a sponge may be used, if desired.

We are well aware that several of the ingredients named have been used before separately or in different combinations in the manufacture of leather-polish, notably the combinations of alcohol, gum-shellac, rosin, and lamp-black, or other coloring-matter; nor do we claim compounds in which these ingredients enter in different proportions; but

We claim and desire to secure by Letters Patent of the United States—

A shoe and leather polish composed of alcohol, gum-shellac, English rosin, oil of sassafras, castor-oil, lamp-black, and beeswax, mixed in the proportions set forth.

In testimony that we claim the foregoing as our own we have hereunto affixed our signatures in presence of two witnesses.

JOHN F. EDDLEMON.
WILSON L. WALKER.

Witnesses:
JNO. T. DAVIS,
GEORGE FURRY.